US008205215B2

(12) United States Patent
Khandrika et al.

(10) Patent No.: US 8,205,215 B2
(45) Date of Patent: Jun. 19, 2012

(54) AUTOMATED EVENT CORRELATION

(75) Inventors: Rajasekhar Khandrika, Hyderabad (IN); Perraju Bendapudi, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1154 days.

(21) Appl. No.: 11/744,786

(22) Filed: May 4, 2007

(65) Prior Publication Data
US 2008/0276253 A1 Nov. 6, 2008

(51) Int. Cl.
G06F 3/00 (2006.01)
G06F 9/44 (2006.01)
G06F 9/46 (2006.01)
G06F 13/00 (2006.01)

(52) U.S. Cl. ............... 719/318; 714/39; 709/224
(58) Field of Classification Search ........... 719/318; 714/39; 709/224
See application file for complete search history.

(56) References Cited

U.S. PATENT DOCUMENTS

| 6,353,902 | B1 * | 3/2002 | Kulatunge et al. ............ 714/712 |
| 6,532,554 | B1 * | 3/2003 | Kakadia ............................ 714/43 |
| 6,707,795 | B1 * | 3/2004 | Noorhosseini et al. ........ 370/242 |
| 7,010,593 | B2 | 3/2006 | Raymond |
| 7,010,651 | B2 | 3/2006 | McGuffin |
| 7,080,141 | B1 | 7/2006 | Baekelmans et al. |
| 7,487,121 | B2 * | 2/2009 | Swarna et al. ................... 705/30 |
| 7,523,463 | B2 * | 4/2009 | Sluiman et al. ................ 719/318 |
| 7,730,172 | B1 * | 6/2010 | Lewis ............................. 709/224 |
| 2004/0122942 | A1 * | 6/2004 | Green et al. ................... 709/224 |
| 2004/0187048 | A1 * | 9/2004 | Angamuthu et al. ............ 714/27 |
| 2004/0199828 | A1 * | 10/2004 | Cabezas et al. ................. 714/39 |
| 2005/0120273 | A1 | 6/2005 | Hudson et al. |
| 2005/0144624 | A1 * | 6/2005 | Riosa et al. .................... 719/318 |
| 2005/0172162 | A1 * | 8/2005 | Takahashi et al. ............... 714/4 |
| 2006/0041659 | A1 * | 2/2006 | Hasan et al. ................... 709/224 |
| 2006/0068712 | A1 | 3/2006 | Kroboth et al. |
| 2006/0233114 | A1 | 10/2006 | Alam et al. |

FOREIGN PATENT DOCUMENTS

EP 1 420 316 A1 5/2004

OTHER PUBLICATIONS

Hanemann et al., A Framework for Service Quality Assurance using Event Correlation Techniques, IEEE, Oct. 17, 2005, pp. 1-6.*
Perrochon et al, Managing Event Processing Networks, Stanford University, Oct. 1999, pp. 1-62.*
G. Liu et al. "Composite Events for Network Event Correlation", Proceedings of the Sixth IFIP/IEEE International Symposium on Integrated Network Management, 1999.
M. Brodie et al. "Intelligent probing: A cost-effective approach to fault diagnosis in computer networks", IBM Systems Journal, vol. 41, No. 3, 2002.
Peter G. Anick et al. "Adapting a Full-text Information Retrieval System to the Computer Troubleshooting Domain", Proceedings of the 17th annual international ACM SIGIR conference on Research and development in information retrieval, 1994.
Microsoft Corporation "Microsoft® System Center Operations Manager 2007. Overview", Published: Dec. 18, 2006; Updated: Apr. 5, 2007.

* cited by examiner

*Primary Examiner* — Diem Cao
(74) *Attorney, Agent, or Firm* — Zete Law, P.L.L.C.; MacLane C. Key

(57) ABSTRACT

Events captured at an application are compared to event correlation instances, wherein an event correlation instance represents a relationship between events of components of the application. The event of a plurality of events that is a potential root cause event of the plurality of events is determined. The potential root cause event and component associated with the potential root cause event are outputted.

19 Claims, 6 Drawing Sheets

500
EVENT CORRELATION TEMPLATE

AUTOMATED EVENT CORRELATION

BACKGROUND

Troubleshooting incidents in complex distributed applications used in enterprises is difficult and time consuming. Information available to system administrators includes events logged by various components of a distributed application. Using these events, an administrator needs to manually backtrack a chain of events to nail down the root cause of an incident. This requires that the administrator have knowledge of relationships between various components of the application and also have knowledge of relationships between the events logged by different components of the application. The administrator must know under what all conditions a given event in a given component occurs. Today's systems fail to provide automated event correlation.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to automated event correlation. Event correlation instances describe the relationships between application components and events logged by the components. Events logged by the application components are compared to the event correlation instances. Matching event correlation instances are analyzed to determine a potential root cause event of a group of events.

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Figure 1:
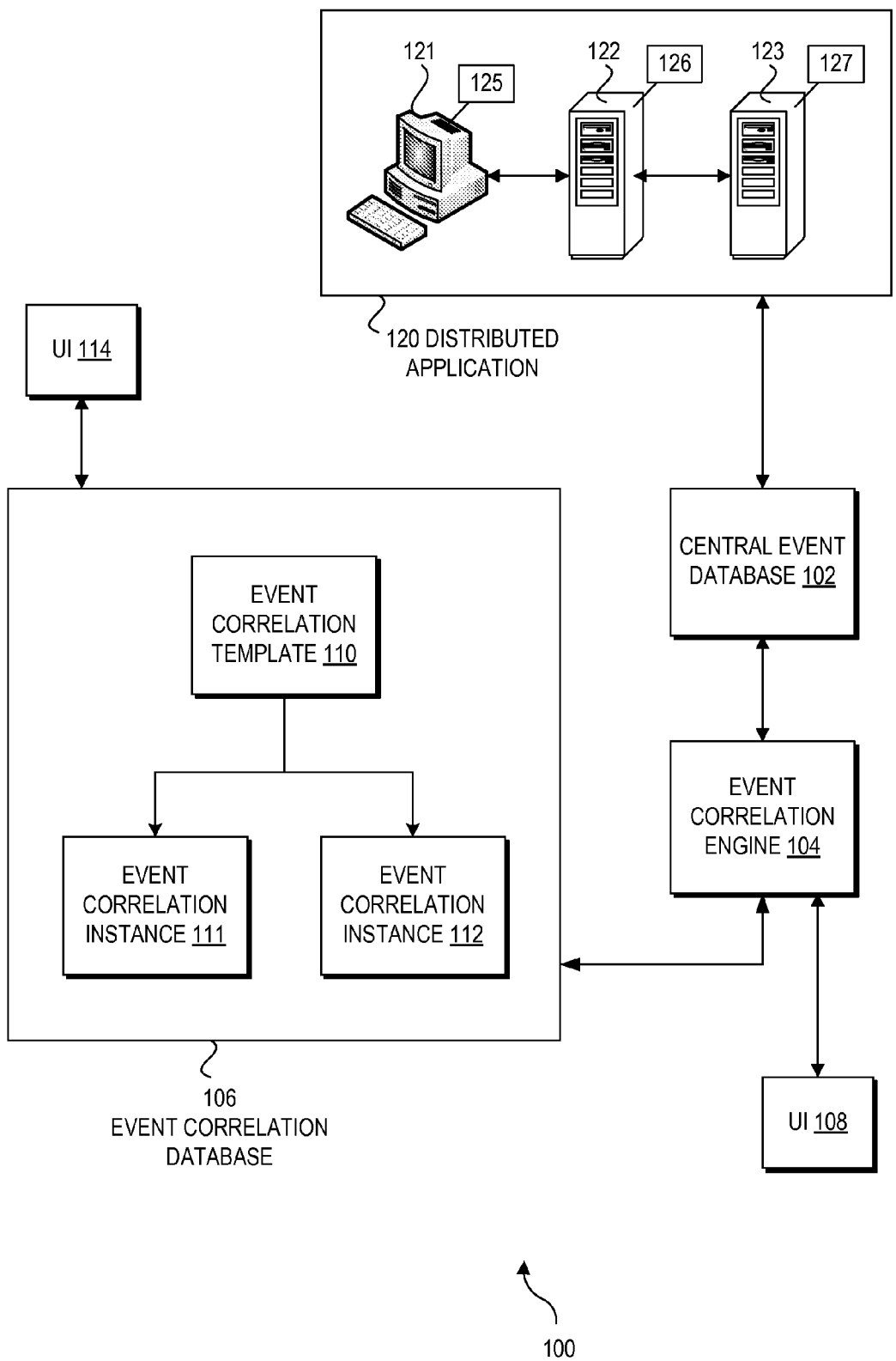
FIG. 1 is a block diagram of an event correlation system in accordance with an embodiment of the invention.

FIG. 1 shows an event correlation system 100 in accordance with an embodiment of the invention. In one embodiment, event correlation system 100 may be part of an enterprise system. System 100 includes a central event database 102 coupled to an event correlation engine 104. Event correlation engine 104 is also coupled to event correlation database 106. It will be appreciated that central event database 102, event correlation engine 104, and event correlation database 106 may reside on the same computing device, different computing devices, or any combination thereof. When residing on different computing devices, components of system 100 may be connected via a network. Embodiments of a computing device are discussed below in connection with FIG. 6.

Event correlation system 100 may include a distributed application 120. Central event database 102 is a database that stores events captured at components of distributed application 120. Distributed application 120 includes an application made up of separate components that execute on different computing devices (and/or different virtual machines on the same computing device) that are connected, such as by a network. An example distributed application includes a client component 125, executing on client 121, that communicates with an application service component 126, executing one or more middle-tier servers 122. The application service component 126 in turn communicates with a storage service component 127 executing on one or more data storage servers 123. System services may work across all three tiers of distributed application 120, such as directory, security, management, event monitoring, and the like. Distributed applications are often deployed in enterprise systems. It will be appreciated that embodiments of the invention are not limited to use with distributed applications, but may be used with an application have components executing on a single computing device.

Distributed application 120 may be monitored by an event monitor system service (e.g., Microsoft® System Center Operations Manager). Events that occur at distributed application 120 may be logged and stored at central event database 102. An event includes an occurrence or happening that is significant to a component of the distributed application. When the event occurs, the event and/or information related to the event are stored in central event database 102.

Event correlation engine 104 includes a service that continuously monitors events being logged into central event database 102 and compares the events against event correlation instances. Any matches between events and event correlation instances are flagged and analyzed to determine a potential root cause event of an incident that triggered one or more events. The results determined by event correlation engine 104 may be displayed in a potential root cause user interface (UI) 108. It will be appreciated that event correlation engine 104 presents a potential root cause event and that a system administrator may have to perform additional analysis to determine if the potential root cause event was the actual root cause event.

Event correlation database 106 may have stored event correlation instances for use by event correlation engine 104. In FIG. 1, event correlation database 106 has stored event correlation instance 111 and event correlation instance 112. In one embodiment, event correlation instances 111 and 112 have been created from event correlation template 110 stored at event correlation database 106. Only one event correlation template 110 is shown for the sake of clarity, but it will be appreciated that event correlation database 106 may have stored various templates 110 to describe various relationships between events and their associated components.

Event correlation template 110 (and its instances 111 and 112) specify various components of distributed application 120, the relationships between the components, and the relationships between events logged by the different components. Event correlation template 110 may be instantiated by adding particular application and computing device details to the template to create event correlation instances 111 and 112. For example, template 110 (and its instances 111 and 112) may capture information such as event E1 in component C1 causes event E2 in component C2.

In one embodiment, template 110 includes a template schema. The template schema contains a list of components, dependencies between them at a high level, and the list of events in each component and their relationships. For example, component C2 depends on component C1. C2.E2 is logged when C1.E1 is logged. When C1.E1 and C2.E2 are found in central event database 102, it is concluded that C2 is in a bad state due to C1.E1. In one embodiment, an event correlation instance may be expressed using an instance schema based on the template schema. For example, machine names where various components of the application are installed are stored in the instance schema.

In one embodiment, event correlation template 110 has been created by a developer of distributed application 120, a third party developer, an experienced system administrator, or the like. Such users have good knowledge of distributed application 120 and understand the relationships between events in different components of distributed application 120. This knowledge may be imparted into template 110. System administrators may tailor an event correlation template to their own enterprise system by instantiating the template and thus have automated troubleshooting when events occur in their distributed applications. Thus, system administrators may have access to expert knowledge of a distributed application and have this knowledge applied to their particular enterprises in an automated fashion.

In one embodiment, an event correlation creation user interface 114 may be used to generate an event correlation instance from an event correlation instance template. In another embodiment, UI 114 may be used by a system administrator to generate event correlation templates for their enterprise system. In one embodiment, template 110 may be downloaded from an Internet site, such as the site of the distributed application developer, to event correlation database 106 for use by a system administrator.

Figure 2A:
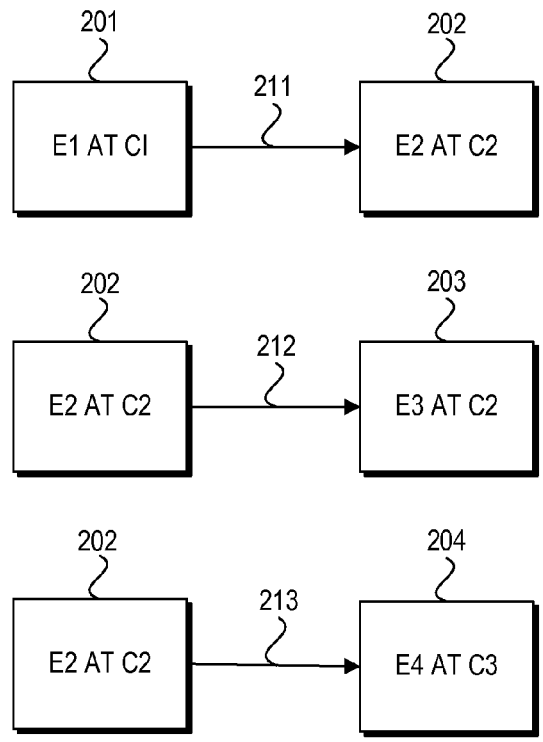
FIG. 2A is a block diagram of event correlation in accordance with an embodiment of the invention.
Figure 2B:
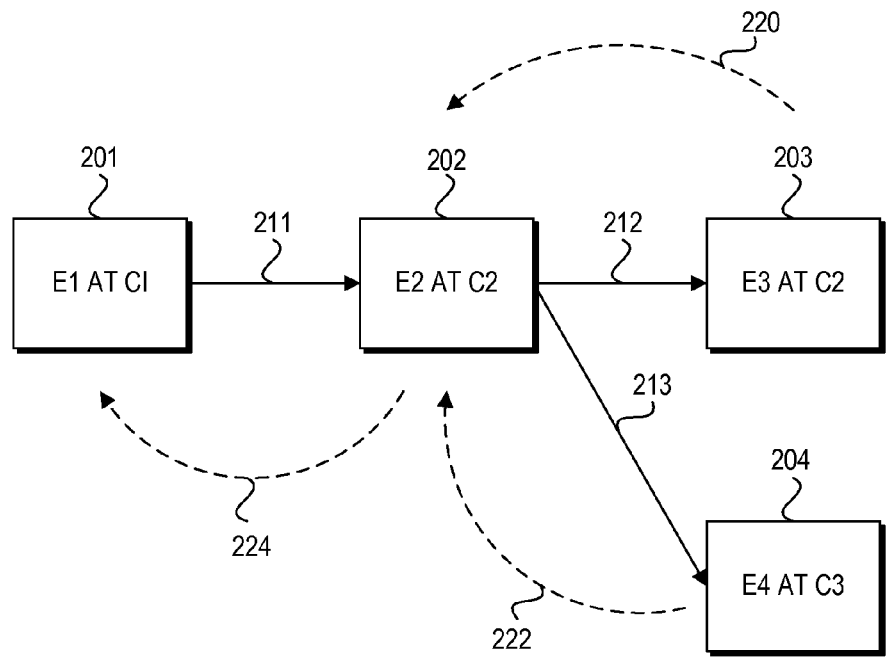
FIG. 2B is a block diagram of event correlation in accordance with an embodiment of the invention.

Turning to FIGS. 2A and 2B, an embodiment of event correlation performed by event correlation engine 104 is shown. In one embodiment, the logic of FIGS. 2A and 2B may be implemented by computer readable instructions executable by one or more computing devices.

FIG. 2A shows events 201-204 that have been captured from a distributed application. Event 201 shows that event 1 (E1) occurred at component 1 (C1). Event 202 shows event 2 (E2) occurred at component 2 (C2). Event 203 shows that event 3 (E3) occurred at component 2 (C2). And event 204 shows that event 4 (E4) occurred at C3. Events 201-204 may be associated with an incident at distributed application 120. An incident includes one or more events that are related. Embodiments herein assist a system administrator in relating several events and identifying the root causal event that may have triggered numerous follow-on events.

FIG. 2A also shows the event correlation instances (i.e., relationships) between events 201-204. An event correlation instance includes a causal event and a resulting event. Event correlation instance 211 (shown by an arrow) indicates that event 201 ("E1 at C2") (i.e., causal event) causes event 202 ("E2 at C2") (i.e., resulting event). Event correlation instance 212 indicates that event 202 ("E2 at C2") causes event 203 ("E3 at C2"). And event correlation instance 213 indicates that event 202 ("E2 at C2") causes event 204 ("E4 at C3"). It will be appreciated that a single event at a single component may have more than one relationship with another event at the same component and/or another component (e.g., the event correlation instances 212-213 between event 202 and events 203-204, respectively).

Event correlation engine 104 may iterate an event through the event correlation instances to find event correlation instances that match the event. These matching event correlation instances may be flagged for further analysis. In one embodiment, the comparison is performed by comparing the event to the causal event of an event correlation instance. For example, an event is compared to event correlation instance 211 by comparing the event to event 201 ("E1 at C2").

The flagged event correlation instances may be linked together, using their event relationships, to generate an event mapping as shown in FIG. 2B. In one embodiment, two event correlation instances may be linked when the resulting event of one event correlation instance is the same as the causal event of another event correlation instance. For example, in FIG. 2B, event correlation instance 211 is linked to event correlation instance 212 since event 202 is the resulting event in event correlation instance 211 and the causal event in event correlation instance 212.

After developing the event mapping from the event correlation instances, event correlation engine 104 may then backtrack through the event correlation instances in the event mapping to discover the event that is the potential root cause of events 201-204. As shown in FIG. 2B, backtrack steps 220 and 222 from events 203 and 204, respectively, arrive at event 202. Backtrack step 224 from event 202 arrives at event 201. Since there is not backtrack relationship from event 201, event 201 is a potential root cause of events 201-204. Event E1 and its corresponding component C1 may then be outputted from event correlation engine 104 as a potential root cause of an incident and displayed in potential root cause UI 108.

Figure 3:
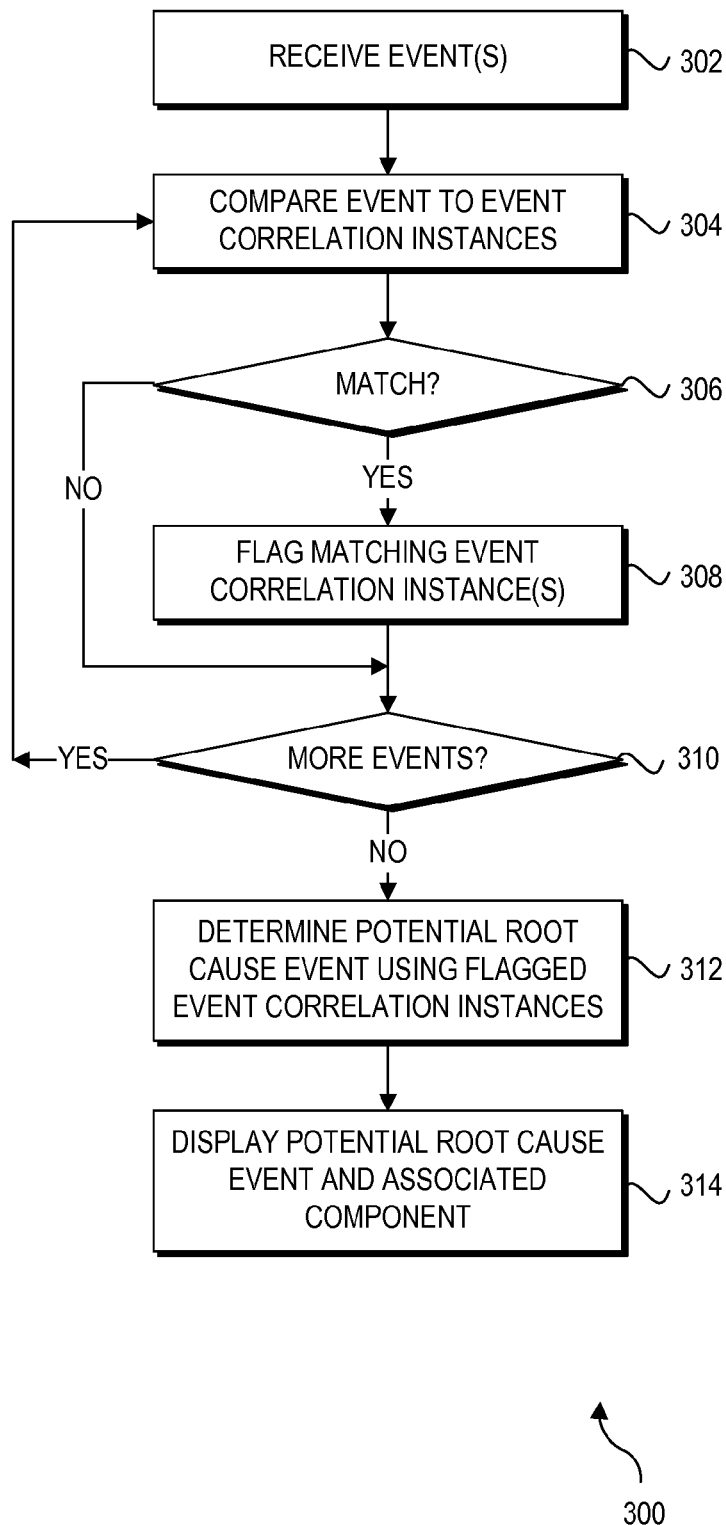
FIG. 3 is a flowchart showing the logic and operations of event correlation in accordance with an embodiment of the invention.

Turning to FIG. 3, a flowchart 300 shows the logic and operations of event correlation by event correlation engine 104 in accordance with an embodiment of the invention. In one embodiment, at least a portion of the logic of flowchart 300 may be implemented by computer readable instructions executable by one or more computing devices.

Starting in block 302, one or more events are received at event correlation engine 104. In one embodiment, the events are received using a push model where central event database 102 pushes events to event correlation engine 104. In one example, events, when logged, are pushed. In another example, events are pushed periodically. In yet another example, new events are pushed when the number of new events passes a threshold. In another embodiment, events are received in a pull model where event correlation engine 104 pulls events from central event database 102. In one example, event correlation engine pulls events periodically.

Continuing to block 304, an event is compared to event correlation instances. The logic iterates through all the event correlation instances to find any that match the event. Next, in decision block 306, the logic determines if there is a match between the event and any event correlation instances. If the answer is no, then the logic proceeds to decision block 310

(discussed below). If the answer to decision block 306 is yes, then the logic proceeds to block 308 to flag the matching event correlation instance(s) for later analysis.

Continuing to decision block 310, the logic determines if there are more events to be compared to the event correlation instances. If the answer is yes, then the logic returns to block 304. If the answer is no, then the logic proceeds to block 312.

In block 312, the logic determines a potential root cause event for a group of events. As discussed in connection with FIG. 2, the logic may backtrack through related event instances to find a root cause event. Proceeding to block 314, the potential root cause event and its associated component are output by event correlation engine 104 and may be displayed to a user. In one embodiment, an event mapping, similar to FIG. 2B, is displayed in potential root cause UI 108.

Figure 4:
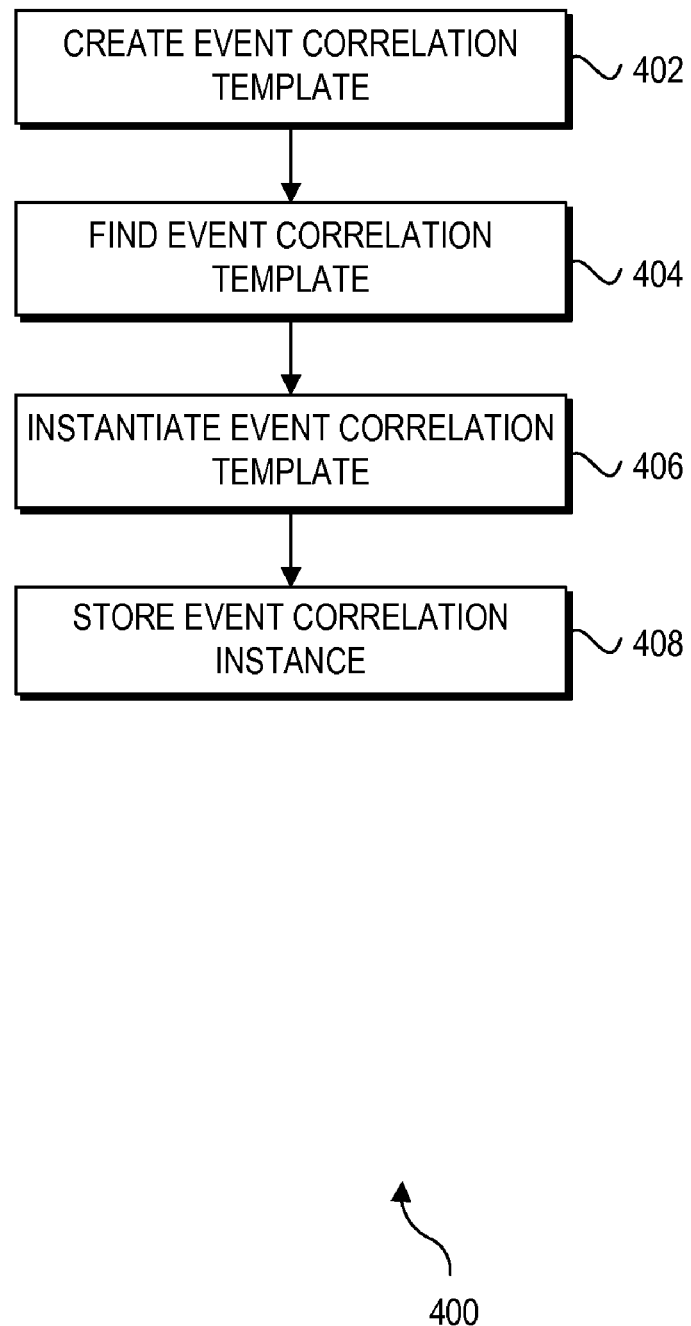
FIG. 4 is a flowchart showing the logic and operations of creating event correlation instances in accordance with an embodiment of the invention.

Turning to FIG. 4, a flowchart 400 shows the logic and operations of creating event correlation instances in accordance with an embodiment of the invention. Starting in block 402, an event correlation template is created. For example, the template may be created by a developer of distributed application 120, a third part developer, or others. In another example, the temple may be created by an experienced system administrator.

Proceeding to block 404, a system administrator finds a pertinent event correlation template. In one example, the template may be downloaded from a developer's web site, a community web forum, etc. In another example, templates have been stored on event correlation database 106 for use by a system administrator.

Continuing to block 406, the event correlation template is instantiated to create an event correlation instance. Instantiation involves modifying the template to include information particular to the enterprise system the event correlation instance will be deployed in. Such information may include information identifying the distributed application (e.g., name, version, etc.), information about computing device(s) that execute the distributed application components (e.g., machine name, network address, etc.), and the like.

Continuing to block 408, the event correlation instance is stored in the event correlation database for use by the event correlation engine.

Figure 5:
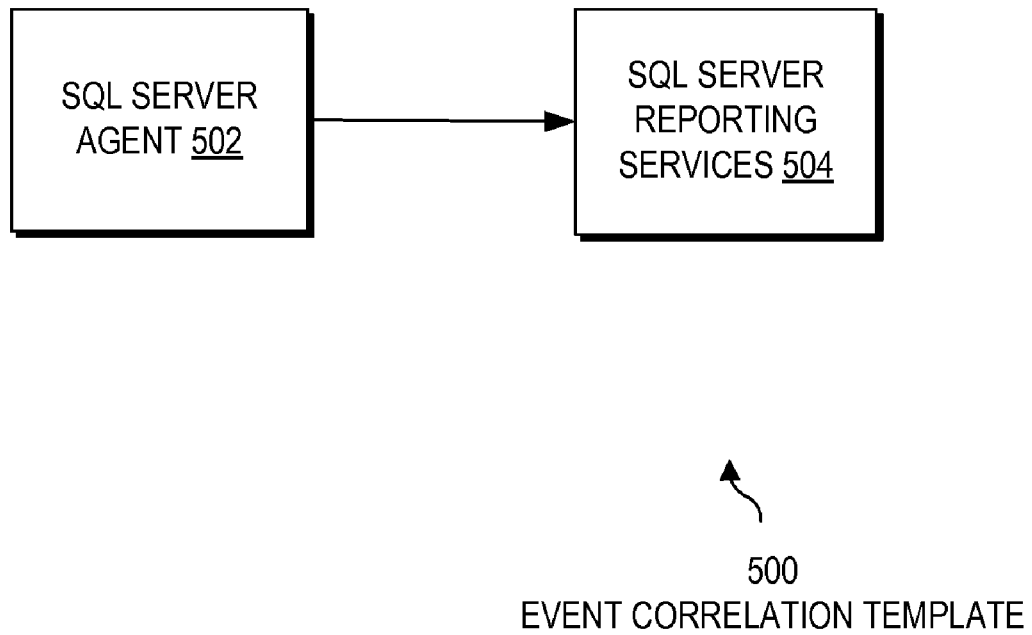
FIG. 5 is an event correlation template in accordance with an embodiment of the invention.

Turning to FIG. 5, an event correlation template 500 in accordance with an embodiment of the invention is shown. In the case of Microsoft® SQL Server, a user will not be able to create a subscription in SQL Server Reporting Services, if SQL Server Agent is not running. SQL Server Reporting Services is a SQL Server component that generates reports about information stored in a database. SQL Server Agent is a SQL Server component that automates some administrative tasks. SQL Server Agent may run jobs, monitor SQL Server, and process alerts.

Event correlation template 500 describes this relationship between an event 504 at a SQL Server Agent component and an event 504 at an SQL Server Reporting Services component. If SQL Server Agent is not running (Event1) at Component1, then SQL Server Reporting Services is unable to create a subscription (Event2) at Component2. Template 500 shows an administrator a potential root cause event as to why a user cannot create a subscription in SQL Server Reporting Services. In one embodiment, to instantiate template 500, server names where the SQL Server Agent component and the SQL Server Reporting Services component are executed are added to template 500 to create a corresponding event correlation instance.

Figure 6:
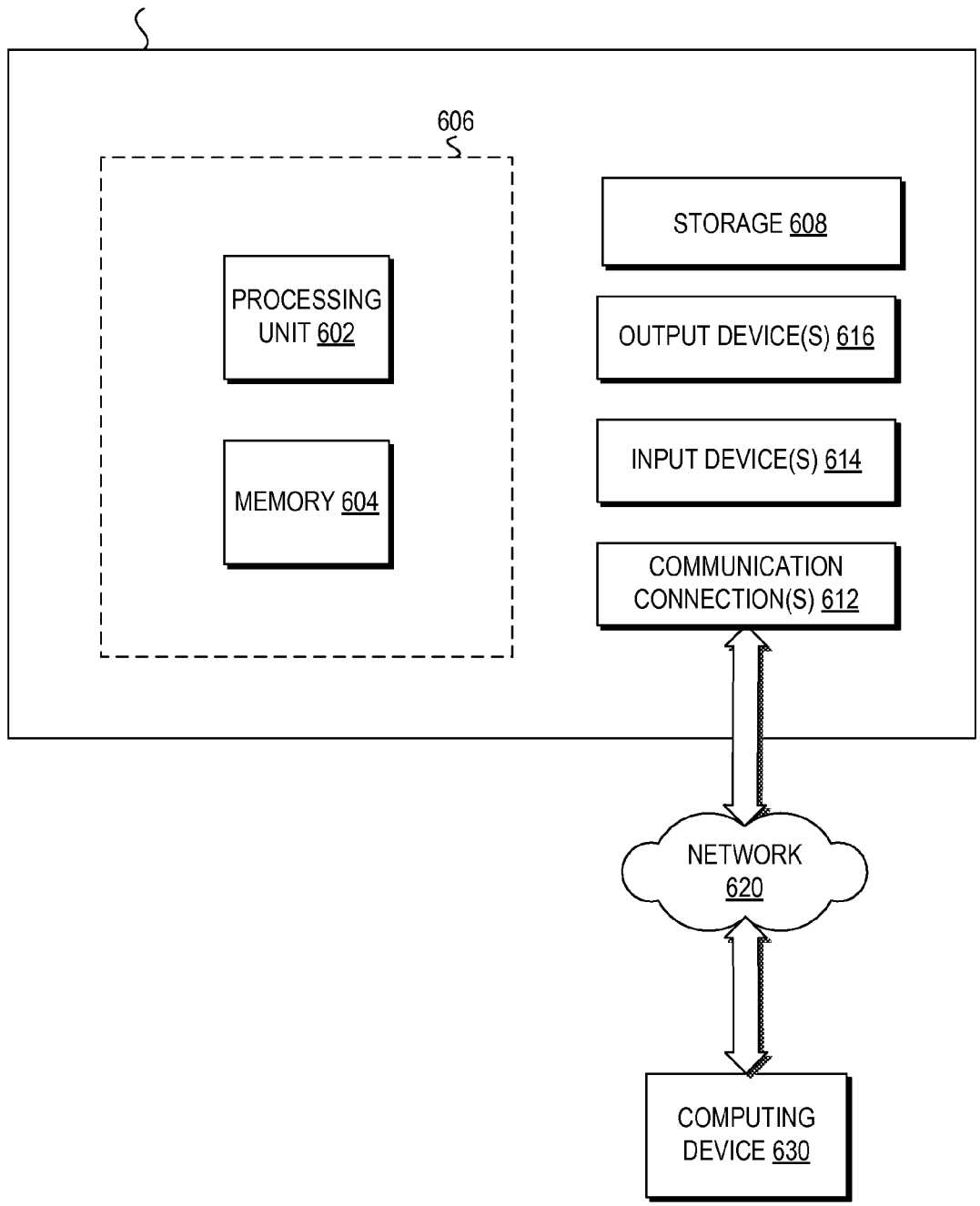
FIG. 6 is a block diagram of an example computing device for implementing embodiments of the invention.

FIG. 6 and the following discussion are intended to provide a brief, general description of a suitable computing environment to implement embodiments of the invention. The operating environment of FIG. 6 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 shows an example of a computing device 600 for implementing one or more embodiments of the invention. In one configuration, computing device 600 includes at least one processing unit 602 and memory 604. Depending on the exact configuration and type of computing device, memory 604 may be volatile (such as RAM), non-volatile (such as ROM, flash memory, etc.) or some combination of the two. This configuration is illustrated in FIG. 6 by dashed line 606.

In other embodiments, device 600 may include additional features and/or functionality. For example, device 600 may also include additional storage (e.g., removable and/or non-removable) including, but not limited to, magnetic storage, optical storage, and the like. Such additional storage is illustrated in FIG. 6 by storage 608. In one embodiment, computer readable instructions to implement embodiments of the invention may be in storage 608. Storage 608 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 604 and storage 608 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 600. Any such computer storage media may be part of device 600.

Device 600 may also include communication connection(s) 612 that allow device 600 to communicate with other devices. Communication connection(s) 612 may include, but is not limited to, a modem, a Network Interface Card (NIC), an integrated network interface, a radio frequency transmitter/receiver, an infrared port, a USB connection, or other interfaces for connecting computing device 600 to other computing devices. Communication connection(s) 612 may include a wired connection or a wireless connection. Communication connection(s) 612 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 600 may include input device(s) 614 such as keyboard, mouse, pen, voice input device, touch input device, infrared cameras, video input devices, and/or any other input device. Output device(s) 616 such as one or more displays, speakers, printers, and/or any other output device may also be included in device 600. Input device(s) 614 and output device(s) 616 may be connected to device 600 via a wired connection, wireless connection, or any combination thereof. In one embodiment, an input device or an output device from another computing device may be used as input device(s) 614 or output device(s) 616 for computing device 600.

Components of computing device 600 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 600 may be interconnected by a network. For example, memory 604 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 630 accessible via network 620 may store computer readable instructions to implement one or more embodiments of the invention. Computing device 600 may access computing device 630 and download a part or all of the computer readable instructions for execution. Alternatively, computing device 600 may download pieces of the computer readable instructions, as needed, or some instructions may be executed at computing device 600 and some at computing device 630. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A method, comprising:
   instantiating an event correlation template to create an event correlation instance, the event correlation template including a template schema containing a list of components, dependencies between the components, a list of events in each component, and relationships between the events in each component;
   comparing events captured at an application to event correlation instances, the event correlation instance representing a causal relationship between events of components of the application;
   generating an event mapping, the event mapping causally linking together at least two of the event correlation instances that match the captured events;
   determining which event of a plurality of events is a potential root cause event of the plurality of events, the determining including backtracking through related event instances of the event mapping; and
   outputting the potential root cause event and component associated with the potential root cause event.

2. The method of claim 1 wherein comparing events captured at the application to event correlation instances includes flagging event correlation instances that match an event.

3. The method of claim 2 wherein determining which event of the plurality of events is the potential root cause event of the plurality of events includes generating the event mapping using the flagged event correlation instances.

4. The method of claim 1, further comprising:
   receiving the events from a central event database, the captured events of the application being stored in the central event database.

5. The method of claim 1, further comprising:
   creating the event correlation template in response to user input at an event correlation creation user interface (UI).

6. The method of claim 1, further comprising:
   downloading the event correlation template from an Internet site.

7. The method of claim 1, further comprising:
   displaying the potential root cause event and associated component in a potential root cause user interface (UI).

8. The method of claim 1 wherein the event correlation template being created by at least one from a set comprising a developer of distributed applications, a third party developer and an experienced system administrator.

9. One or more computer storage media storing computer readable instructions that when executed perform operations comprising:
   instantiating an event correlation instance from an event correlation template in response to user input, the event correlation template including a template schema containing a list of components, dependencies between the components, a list of events in each component, and relationships between the events in each component;

comparing events captured at a distributed application to event correlation instances, the event correlation instance representing a causal relationship between events of components of the distributed application;

flagging a first event correlation instance that matches a first event, the first event correlation including a first causal event and a first resulting event;

flagging a second event correlation instance that matches a second event, the second event correlation including a second causal event and a second resulting event;

generating an event mapping, the event mapping causally linking together at least two of the event correlation instances that match the captured events;

determining which event of a plurality of events is a potential root cause event of the plurality of events, the determining including backtracking through a causal linkage between the at least two of the event correlation instances; and outputting the potential root cause event and component associated with the potential root cause event.

10. The one or more computer storage media of claim 9 wherein generating the event mapping includes:

generating the event mapping using the flagged first and second event correlation instances, the event mapping linking together the first and second event correlation instances, the first resulting event of the first event correlation being the same as the second causal event of the second event correlation instance.

11. The one or more computer storage media of claim 10 wherein determining which event of the plurality of events is the potential root cause event of the plurality of events includes:

backtracking from the second resulting event to the second causal event; and backtracking from the second causal event to the first causal event, the first causal event being the potential root cause event.

12. The one or more computer storage media of claim 9 wherein the computer readable instructions when executed further perform operations comprising:

creating the event correlation template in response to user input.

13. The one or more computer storage media of claim 9 that when executed perform operations comprising:

downloading the event correlation template from an Internet site.

14. A system, comprising:

one or more processors operatively coupled to one or more memories to provide: an event correlation database to store event correlation templates and event correlation instances, an event correlation instance being instantiated from event correlation template, the event correlation instance representing a causal relationship between events of components of a distributed application, the event correlation template including a template schema containing a list of components, dependencies between the components, a list of events in each component, and relationships between the events in each component; and an event correlation engine to compare events having occurred at the distributed application to the event correlation instances stored in the event correlation database and to determine which event, and corresponding component, was a potential root cause event of a plurality of events by backtracking through a causal linkage between at least two event correlation instances.

15. The system of claim 14 wherein to compare events having occurred at the distributed application to the event correlation instances stored in the event correlation database includes:

flagging event correlation instances that match an event.

16. The system of claim 15 wherein to determine which event, and corresponding component, was the potential root cause of a plurality of events includes:

generating an event mapping using the flagged event correlation instances, the event mapping causally linking together related event correlation instances; and backtracking through the event mapping to find the potential root cause event.

17. The system of claim 14, further comprising:

a central event database to store events captured at the distributed application and to provide the events to the event correlation engine.

18. The system of claim 14, further comprising:

a user interface module creating the event correlation template in response to a user input.

19. The system of claim 14, further comprising:

a potential root cause user interface module displaying the potential root cause event and associated component.

* * * * *